July 28, 1964 J. RABINOW 3,142,761

PHOTOSENSITIVE LINE FOLLOWING SERVO SYSTEM FOR READING MACHINES

Filed Nov. 30, 1960

INVENTOR
Jacob Rabinow

BY Joseph A. Genovese

ATTORNEY

United States Patent Office 3,142,761
Patented July 28, 1964

3,142,761

PHOTOSENSITIVE LINE FOLLOWING SERVO SYSTEM FOR READING MACHINES

Jacob Rabinow, Bethesda, Md., assignor, by mesne assignments, to Control Data Corporation, Minneapolis, Minn., a corporation of Minnesota Filed Nov. 30, 1960, Ser. No. 72,702
15 Claims. (Cl. 250—219)

This invention relates to reading machines and particularly to techniques and devices to enable reading machines to function more accurately by promptly homing on a line of characters, and solving problems of vertical registration which may arise while the line is being scanned.

Vertical registration of characters presents a serious and difficult problem in character recognition machines. For instance, the M. H. Glauberman Patent No. 2,932,006, among others, points this out as being a limiting disadvantage of prior reading machines. Although the Glauberman patent discloses a character recognition machine whose performance is independent of vertical registration, Glauberman supplies additional scanning photocells allowing for vertical registry variation. Apparently, these photocells are simply extra photocells which increase the width of the scanner for reading the characters of a line.

Other character recognition machines, e.g., Sprick Patent No. 2,838,602 require that the center of each character be located and scanned accordingly. This directly or indirectly solves vertical registration problems, but at the expense of complicated scanning. W. J. Lohninger, U.S. Patent No. 2,927,216 employs a light flux measuring system and masks for the characters, to develop information on which misalignment correction may be made. Lohninger discloses moving the character or the mask or rotating the optics of his system for correction. Each alternative is difficult to perform at high speed.

The problem of vertical registration has several solutions, for instance, primarily optical as disclosed by Lohninger. Another solution is to make vertical registration corrections by the reading machine proper, for example by shifting the information to a predetermined position in the memory before recognition, as disclosed in the J. Rabinow et al., Patent No. 3,104,369. These techniques are satisfactory but the amount of possible correction is ordinarily small. In other words, unless the character is within the view of the scanner, a character recognition machine would ordinarily have no means to identify the characters on the basis of a portion thereof. More specifically, if an "A" is clipped at the top, a character recognition machine would probably fail to identify the character or worse, read the A as an H.

An object of the invention is to provide a simple system for obtaining and/or maintaining line-to-scanner registration within tolerance acceptable to the reading machine.

Another object of the invention is to provide a servo system which provides error signals that are applied to obtain and keep line-scanner alignment as a line of intelligence is being scanned, for instance by the scanning head of a reading machine.

Reading machines are often used to read individual lines of print, for example typewritten sheets. Finding the beginning of each line is a difficult problem, especially for high-speed machines. One way of doing this is by "dead reckoning" which implies precise sheet handling and positioning to present the successive lines to the scanner or vice versa.

My invention does not rely solely on dead reckoning to find the beginning of a line. The precision required of high speed sheet-handling devices plus differences in interline spacing reduces the reliability of a simple dead reckoning technique. As described previously, my invention servos the scanner to the character of a line, centering the scanner with respect to the line.

Another object of my invention is to provide means, compatible with high-speed reading machines, for finding and servoing to (when necessary) the beginning of a line of characters.

The above objectives may be accomplished in a number of ways. One mode of practicing my invention is to scan a line of intelligence with a row of photocells. The row is made longer than the width of the line of characters, the latter being "seen" by the photocells as a blur, if it is assumed that the line of characters is moving at a high speed with respect to the response speed of the servo circuits. Those photocells which lie beyond the longitudinal edges of the blur define detection sections which are sensitive to deviations from the longitudinal edges of the line (or its image). The information obtained by these sections is processed by logic circuits to produce outputs from which signals are derived to furnish servo corrections for adjustment of the scan head to the characters of a line.

Other objects and features of importance will become apparent in following the description of the illustrated form of the invention.

Although my servo system may be used in connection with recognition of individual characters at low speed, the more difficult problem arises in high speed identification of characters of lines. In those instances where the user has virtually complete control over the typing, printing, font, spacing, etc., any vertical registration problem can be somewhat minimized by accuracy of the typed material. However, for average typing, the characters of a line are not always in perfect horizontal or vertical alignment. Furthermore, the art is constantly progressing toward the point where the character reading machines of moderate price will be expected to function properly with material over which there is no unusual control in printing. An example is typewritten material where there is no requirement of extraordinary typewriter adjustment.

Figure 1:
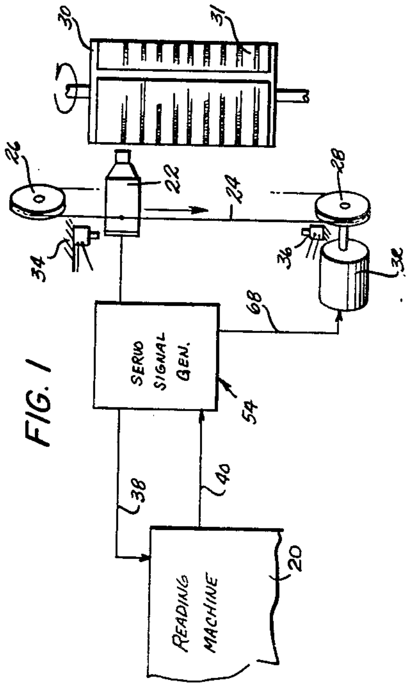
FIGURE 1 is a schematic view showing portions of a reading machine including the character area handling device and scanner, together with a diagrammatic representation of my servo system.

To show the principles of my invention attention is directed to the fragment of reading machine 20 in FIGURE 1. Reading machine 20 may be constructed along the line of the reading machine disclosed in the J. Rabinow et al. Patent No. 3,104,369 or in other ways known in the art. For simplicity I shall limit my subsequent description to such a machine, although it is to be clearly understood that my line finding and following servo system may be used with numerous other types of machines.

Scanning head 22 is attached to an endless belt 24 constrained by pulleys 26 and 28, to travel in a radial plane of, and parallel to the axis of drum 30. The drum is rotated by a motor not shown) and has means for retaining intelligence bearing material on its surface. For example, the intelligence bearing material may be a sheet 31 of paper with lines of characters printed thereon as would be the case of a typewritten sheet or a page from a book. It is usually preferred that the sheet be light (white) to contrast with dark (black) characters, although this is not a rigid requirement.

Figure 3:
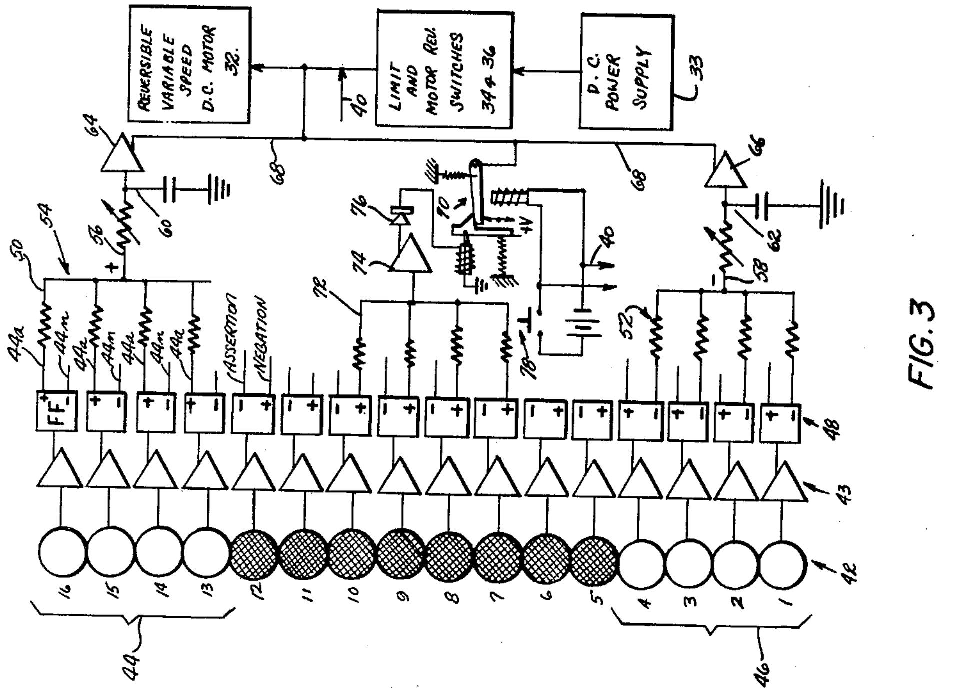
FIGURE 3 is a more detailed schematic view showing the circuitry of my servo system.

For the purposes of this invention it is unimportant how the head 22 is mounted and propelled, but I have illustrated a motor 32 which drives pulley 28. The motor can be a D.C. motor and has conventional reversing or limit switches 34 and 36 wired thereto and located at the ends of the path of travel of head 22. When the head strikes the operators of the limit switches, the polarity of the motor power supply 33 (FIGURE 3) is changed causing the motor 32 to operate in the opposite direction. When head 22 moves in one direction it "reads" by equipment forming no part of this invention, and when it returns it does not "read."

As disclosed in Patent No. 3,104,369 reading head 22 scans the characters of lines, and the scan information is conducted on line 38 to the recognition circuits of the reading machine. Further, the reading machine is easily made to produce "new line" signals on conductor 40 by recognizing a long clear white space at the end of a line and requiring that the space be considerably longer than the normal spacing of words. The signals on line 40 can be applied in either place shown in FIGURE 3.

Figure 2:
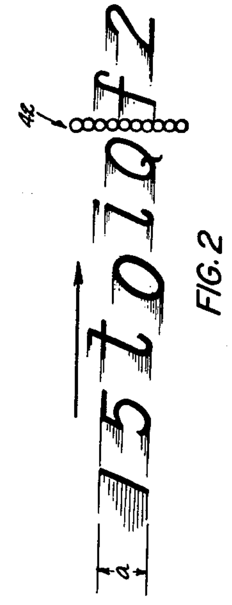
FIGURE 2 is a diagrammatic view showing a line of intelligence as it would appear to scanner photocells arranged at right angles to the line.

FIGURE 2 shows the relationship of row 42 of scanning photocells of scan head 22 to a moving line of characters. The characters appear to row 42 as a blur of an average width "*a*." The photocells 1–16 of row 42 are arranged so that several photocells will be on opposite sides of the average width of the blur. These photocells, defined as sections 44 and 46 (FIGURE 3), detect deviations from the average longitudinal edges of the blur. Another way to consider this is that the sections 44 and 46 seek excursions of parts of the blur from the longitudinal edges of the blur, as would be the case for the letter O in FIGURE 2.

Photocells 1–16 inclusive feed respective amplifiers 43. The outputs of the amplifiers are fed to respective bi-stable devices or equivalent digital means, for example, conventional flip-flops 48. For the purpose of explaining the principle of the invention assume that the flip-flops have +6 and −6 volt outputs at the two output wires thereof, depending whether the photocells "see" white or black, i.e. the absence of any part of the character or a part of the character respectively. When black is seen, the two outputs switch values, i.e., the formerly high one (+6) becomes low (−6), and vice versa.

For section 44, the assertion wires 44*a* of the flip-flops for photocells 13, 14, 15 and 16 are connected with resistors of an electrical output adding means shown as a resistor adder matrix 50. An assertion is considered the high (+6) output and the negation the low (−6) output of a flip flop 48 when its photocell circuitry, as designed, "sees" white. This may be reversed, as in the case of the circuit of photocell 12. Regarding section 46, the negation wires of the flip-flops for photocells 1–4 are connected to resistors of matrix 52. The assertion and negations, the flip flops, amplifiers and photocells discussed herein are essentially identical to those described in Patent No. 3,104,369. Resistor matrices 50 and 52 may simply be additional matrices like those in Patent No. 3,104,369, however, this need not be the case. Instead, my servo signal generator 54 (FIGURE 1) may be a component separate from the reading machine 20. The servo signal generator 54 includes the amplifiers 43, flip flops 48, the resistor matrices 50 and 52, and other circuitry to be described and identified subsequently.

By selecting assertion and negation wires as described, I obtain a positive servo correction output on line 56 from matrix 50 and a negative output on line 58 from resistor matrix 52. In other words, photocells 1–4 and 13–16 seek "white" to provide the desired respective positive and negative servo correction outputs. The outputs on lines 56 and 58 from matrices 50 and 52 are filtered as at 60 and 62 by conventional RC filters with predetermined time constants, so that the filtered outputs emulate the referred to blur. The filtered outputs are fed to amplifiers 64 and 66. Line 68 is connected to the output of amplifiers 64 and 66, and the signals thereon are applied to the motor 32 as a positive or negative analog servo correction signal. These are impressed on motor 32 to drive the scan head 22, so that it is servoed to the line of characters as required by the information outputs of sections 44 and 46.

Latching relay 70 (FIGURE 3) is disclosed for the purpose of showing a general way of initially moving the scan head 22 to the first line without relying upon a "new line" signal from any specific reading machine 20. The relay, when latched by momentary closing of switch 78, applies a positive voltage (+V) to line 68 thereby impressing a comparatively heavy positive voltage on motor 32 causing the head 22 to move down (as drawn in FIGURE 1) until the first character of the first line is detected by photocells 7, 8, 9 and 10. The flip flops at the center of row 48 for photocells 7–10 have their negation wires connected to resistor adder matrix 72, whose output signal is conducted to amplifier 74. When the photocells 7–10 see black (the blur shown in FIGURE 2) the output of amplifier 74 is fed through a unidirectional device, for instance diode 76, to the release coil of latching relay 70. At that moment the latching relay is released by energization of the release coil. From this point on the servo correction signals are applied from photocell sections 44 and 46 by way of amplifiers 64 and 66 as described previously.

Although I have shown and described a specific embodiment and several uses of my invention, it is obvious that many modifications thereof are possible. My invention, therefore, is not to be restricted except as is necessitated by the prior art and the scope of the following claims.

I claim:

1. In a reading machine having a device to move an area relative to a scanner where the area contains a line of characters having an average longitudinal centerline portion and there are means to provide relative motion between the scanner and area transverse to the line of characters for positioning the scanner to said line of characters, the improvement comprising means for centering the scanner to the average longitudinal centerline position of the line of characters, said centering means including means on a side of the characters and responsive to the characters themselves to provide a correction signal for said relative motion providing means during the scanning of more than one character of the line.

2. For use with a character recognition system having a device to move an area containing lines of characters, a scanner adjacent to said area, means to move the scanner with respect to the area, said device moving said area at a comparatively high speed with respect to the response time of the scanner so that the characters of a line appear as an elongate blur to the scanner, means on opposite sides of the line of characters and for detecting a departure of the scanner from the edges of said blur and for producing an electrical output corresponding to the departure, and means responsive to said electrical output for producing and conducting a corresponding analog servo signal to said scanner moving means.

3. In a system to servo a movable scanner into alignment with a line of characters where the average width of the line can be within a range of widths, photosensitive detection means having sections positioned on opposite sides of the line, means for producing servo signals from each of said sections, said signals being proportional to the amount of the sections which sense parts of characters of the line, and means responsive to the combined value of both of said signals for aligning the scanner with the line of characters.

4. In combination with a scanner for a line of intelligence, means for detecting the center part of one end of the line of intelligence to provide initial line-to-scanner alignment, servo system means to maintain said alignment and including means for producing outputs responsive to deviations from said alignment, and means responsive to said outputs to provide servo correction signals for maintaining said alignment.

5. The subject mater of claim 4 wherein said outputs producing means include photosensitive members arranged to inspect the longitudinal edge regions of the line of intelligence.

6. In a reading machine, a scanning head, means for moving a line of characters past said head, motor means for moving said head transversely to said line to position said head with respect to said line, means comprising line sensing means fixed relative to said scanning head and having at least one section normally on one side of said line, for providing a signal when said line sensing means senses any portion of said line of characters; and motor control means actuated by said signal for controlling said motor means to move said head so as to return said line sensing means to its normal position on said one side of the line.

7. The subject matter of claim 6 wherein said sensing means have a second section fixed to said head and normally on the other side of said line of characters, for providing a second signal when said second section senses any portion of said line of characters; and said motor control means including means actuated by said second signal to also return said line sensing means to its normal position between said first and second sections.

8. In a reading machine for a line of characters on an area where there are means to move said area, a scanner for the line of characters, means to detect the beginning of the line, and means to maintain scanner-to-line alignment to compensate for line skew character misregister, said detection means including means to detect the approximate center-line area of said line of characters at the beginning of the line and provide a signal in response to scanner-to-line alignment, and said maintaining means including means to provide a signal corresponding to the amount of misalignment between said scanner and one edge of said line as the line of characters on said area is moved past said scanner so that the scanner-to-line alignment may be continually maintained.

9. In a reading machine for a line of characters on an area which is moved, a scanner of a size to cover the width of the line, said scanner providing scanner outputs and said scanner having additional sections on each side of the line when said scanner is aligned with said line, servo motor means to retain scanner-to-line alignment, means responsive to the outputs of said sections to provide electrical signals which correspond to the amount of deviation from said scanner-to-line alignment, means for filtering the components of said signals which correspond to minor short-duration deviations from said alignment, and means to conduct the filtered signals to said servo motor means.

10. The subject matter of claim 9 and means responsive to preselected scanner outputs to detect initial scanner-to-line alignment by seeking the center area of the first character of the line and by providing a servo correction signal to said servo motor means in response to misalignment of said scanner and said first character.

11. The subject matter of claim 10 and means for inhibiting the initial scanner-to-line alignment seeking means when alignment is attained at the beginning of the line after which said sections outputs are relied on to maintain said alignment.

12. In a reading machine having a handling device for moving an area relative to a scanner where the area contains lines of characters, the movement of said area being generally parallel to said lines, and means to provide relative motion between the scanner and area transverse to said lines for positioning the scanner in alignment with the individual lines of characters, the improvement comprising; a servo system to require that the scanner remain aligned with a line, said system having means to detect at least one longitudinal boundary of the line and to produce signals when the scanner becomes misaligned by an excursion over said boundary, digital means responsive to said signals to provide electrical outputs, adding means for said outputs, and means responsive to said added outputs for actuating said positioning means.

13. Positioning apparatus to adjust a scan head to a predetermined transverse position relative to a line of characters wherein there are means for moving the scan head with respect to the line, said apparatus comprising photosensitive scanning means wider than the line thereby providing sections of the scanning means on opposite sides of the line, means responsive to the output of one section to provide transverse adjustment signal for said head moving means, and means responsive to the output of a second section to provide another transverse adjustment signal for said head moving means.

14. The positioning apparatus of claim 13 wherein one of said signal providing means includes a matrix of electrical components, and bistable devices feeding said matrix and set by the output of one of said sections of the photosensitive scanning means.

15. The positioning apparatus of claim 14 and an electrical filter connected with the output of said matrix.

References Cited in the file of this patent

UNITED STATES PATENTS

| | | |
|---|---|---|
| 2,792,504 | Slamar et al. | May 14, 1957 |
| 2,810,316 | Snyder | Oct. 22, 1957 |
| 2,838,602 | Sprick | June 10, 1958 |
| 2,927,216 | Lohninger | Mar. 1, 1960 |
| 2,972,794 | Saul et al. | Feb. 28, 1961 |
| 3,037,076 | Williams et al. | May 29, 1962 |
| 3,050,711 | Harmon | Aug. 21, 1962 |
| 3,052,405 | Woodland | Sept. 4, 1962 |
| 3,058,093 | Vernon et al. | Oct. 9, 1962 |
| 3,060,262 | Hoer | Oct. 23, 1962 |
| 3,069,464 | Fischer | Dec. 18, 1962 |
| 3,070,700 | Budnick | Dec. 25, 1962 |

OTHER REFERENCES

Wireless World, Reading by Electronics, April 1957, volume 63, pages 173–175.